(12) United States Patent
Glain

(10) Patent No.: US 12,202,606 B2
(45) Date of Patent: Jan. 21, 2025

(54) SYSTEM FOR DEPLOYING A SEPARATION CURTAIN TO CREATE A RESTING SPACE INSIDE AN AIRCRAFT CABIN

(71) Applicant: Safran Seats, Plaisir (FR)

(72) Inventor: Arthur K. Glain, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/700,901

(22) PCT Filed: Oct. 19, 2022

(86) PCT No.: PCT/EP2022/079026
§ 371 (c)(1),
(2) Date: Apr. 12, 2024

(87) PCT Pub. No.: WO2023/066960
PCT Pub. Date: Apr. 27, 2023

(65) Prior Publication Data
US 2024/0409219 A1    Dec. 12, 2024

(30) Foreign Application Priority Data

Oct. 20, 2021    (FR) ........................................ 2111118

(51) Int. Cl.
*B64D 11/06*      (2006.01)
*B64D 11/00*      (2006.01)

(52) U.S. Cl.
CPC ...... *B64D 11/0606* (2014.12); *B64D 11/0601* (2014.12); *B64D 2011/0076* (2013.01)

(58) Field of Classification Search
None
See application file for complete search history.

(56) References Cited

U.S. PATENT DOCUMENTS

2021/0163139 A1* 6/2021 Bonnefoy .............. B64D 11/06

FOREIGN PATENT DOCUMENTS

EP    3643615 A1    4/2020

OTHER PUBLICATIONS

International Patent Application No. PCT/EP2022/079026, International Search Report and Written Opinion, dated Dec. 12, 2022.

* cited by examiner

*Primary Examiner* — Tye William Abell
(74) *Attorney, Agent, or Firm* — Kilpatrick Townsend & Stockton LLP

(57) ABSTRACT

The invention relates primarily to an assembly for an aircraft cabin (10), comprising:
- at least one seat unit (11) comprising a seat (12) and a privacy shell (13) extending at least partially around the seat (12),
- at least one separation curtain (21), and
- a storage compartment (18) delimiting an internal volume (22),
- a system (20) for deploying the separation curtain (21) being configured to selectively switch the separation curtain (21) between:
  - a stored state in which said separation curtain (21) is disposed predominantly inside the internal volume (22) of the storage compartment (18), and
  - a deployed state in which said separation curtain (21) is disposed predominantly outside the internal volume (22) of the storage compartment (18) so as to at least partially delimit an enclosed resting space (25) around the seat unit (11).

8 Claims, 6 Drawing Sheets

[Fig. 1]
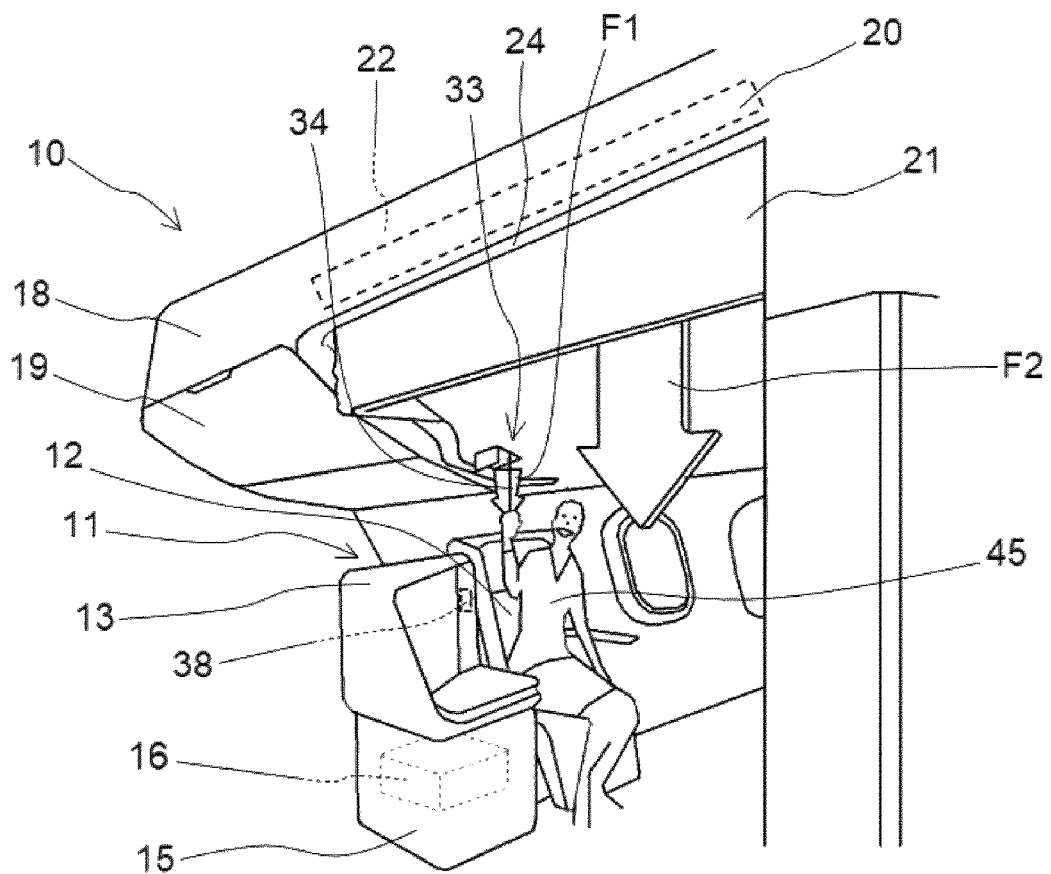
[Fig. 2]
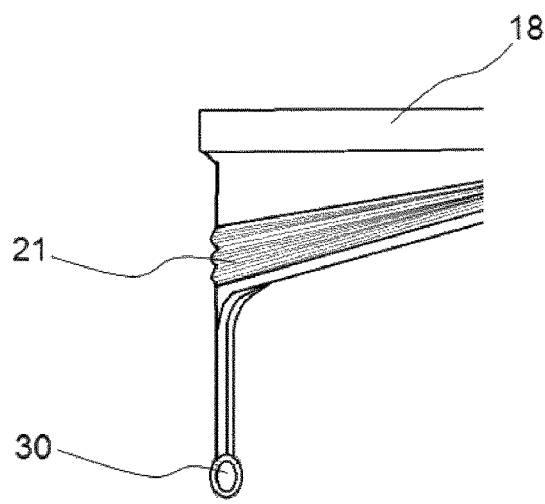

[Fig. 3]
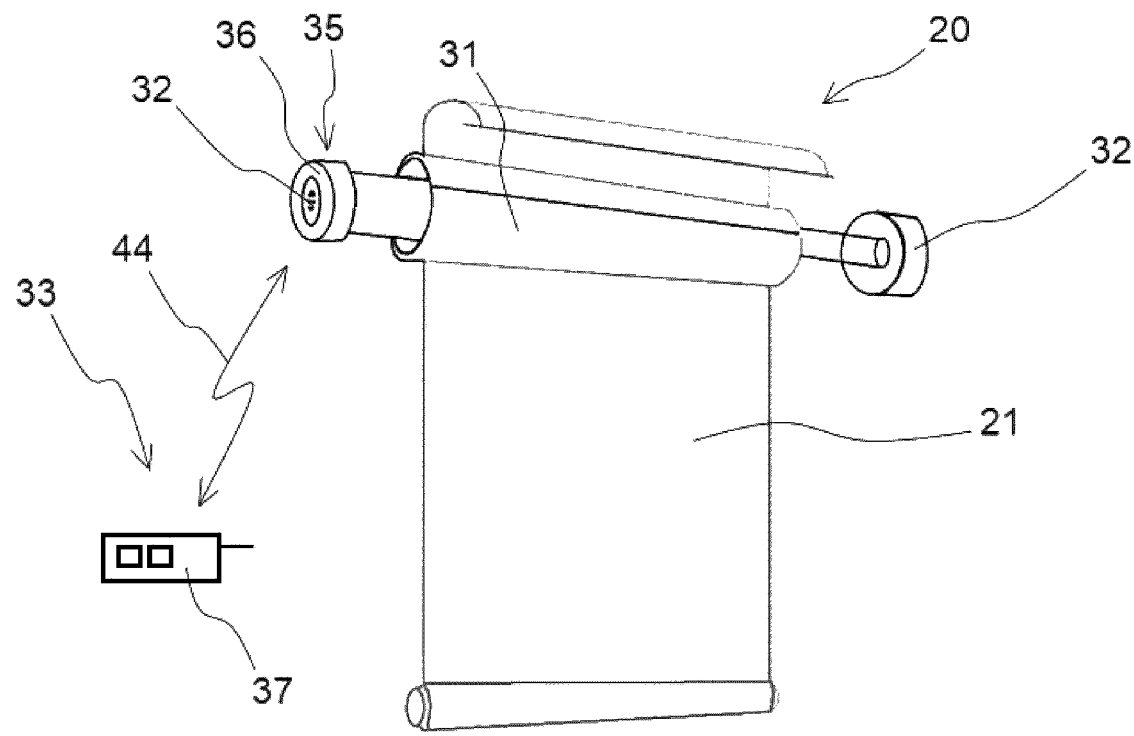
[Fig. 4]
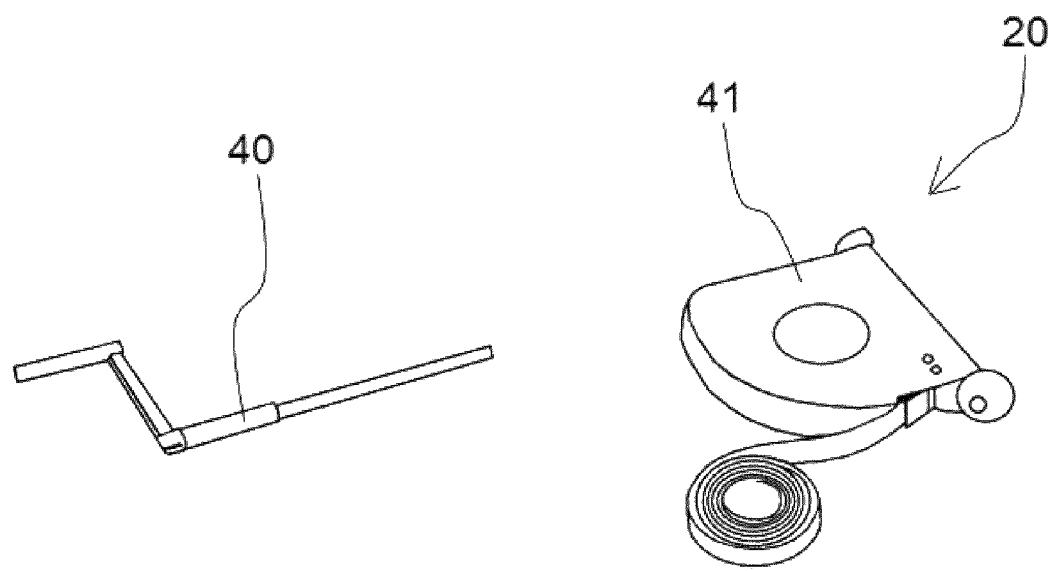

[Fig. 5a]
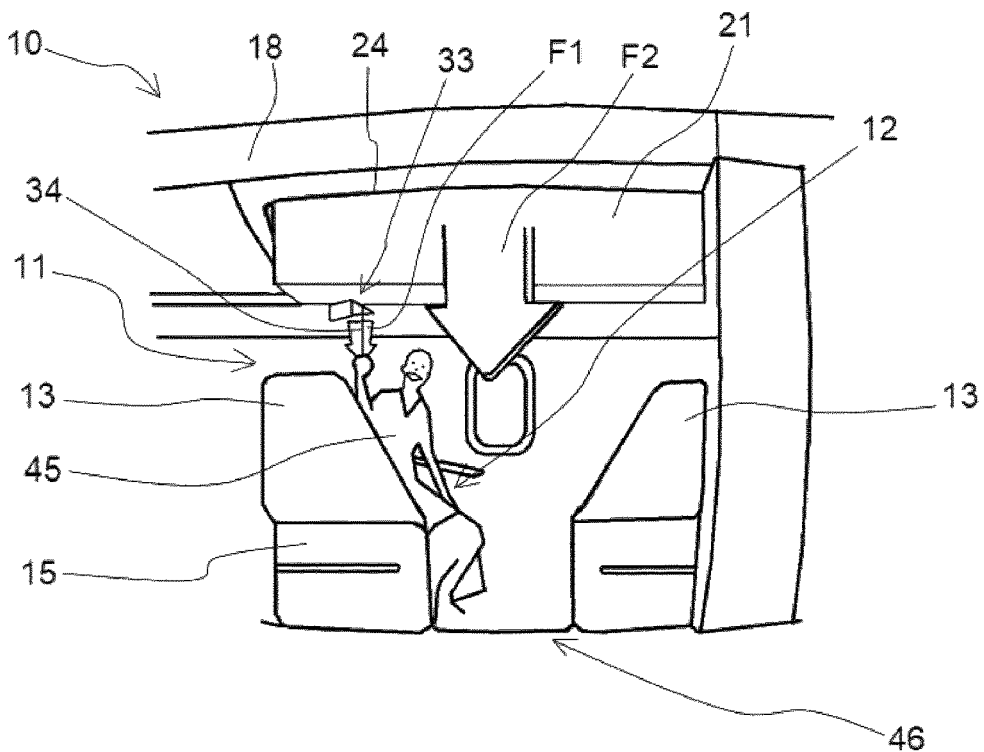
[Fig. 5b]
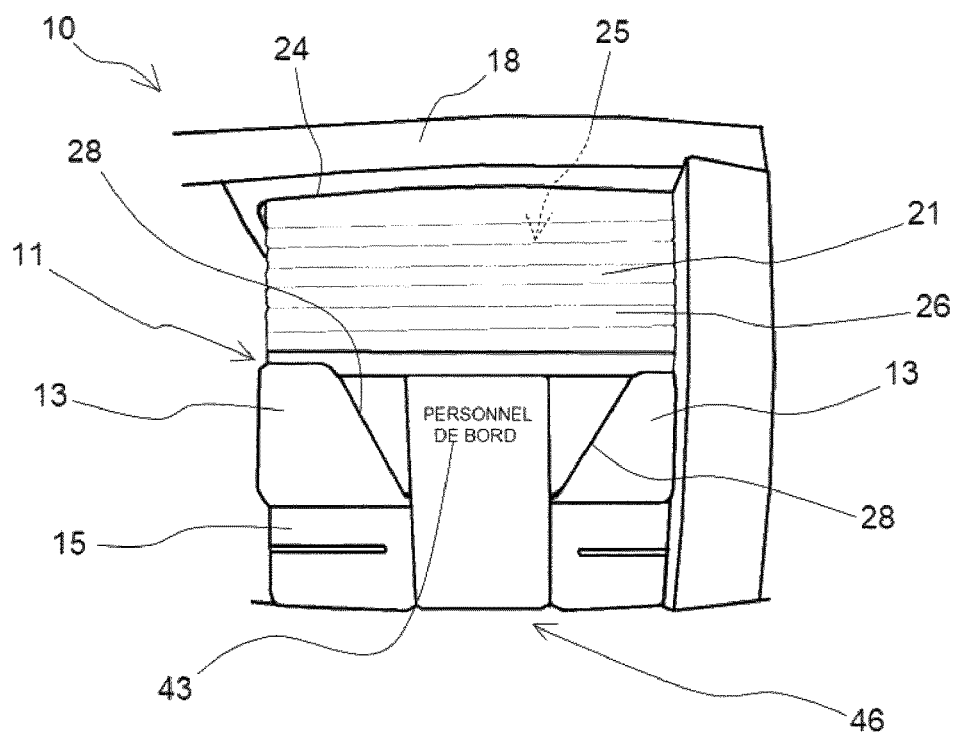

[Fig. 6]
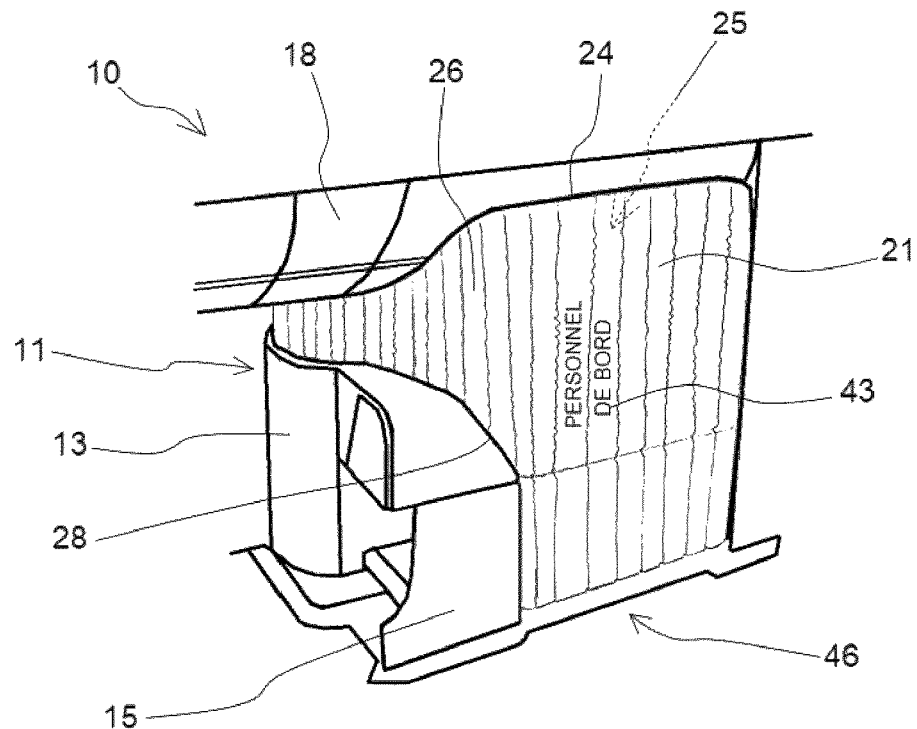
[Fig. 7]
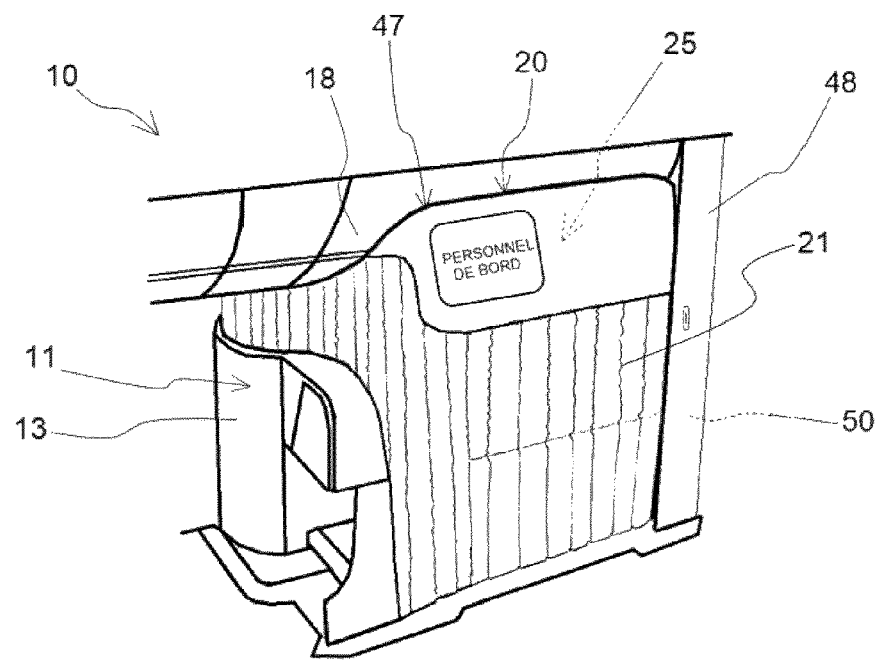

[Fig. 8]
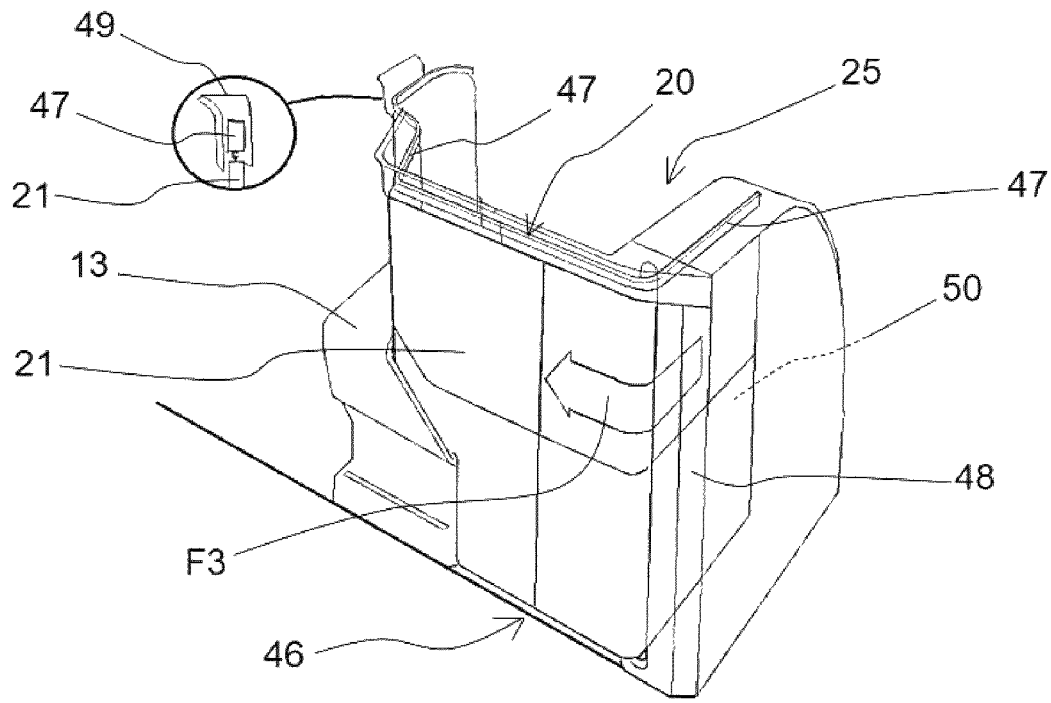
[Fig. 9]
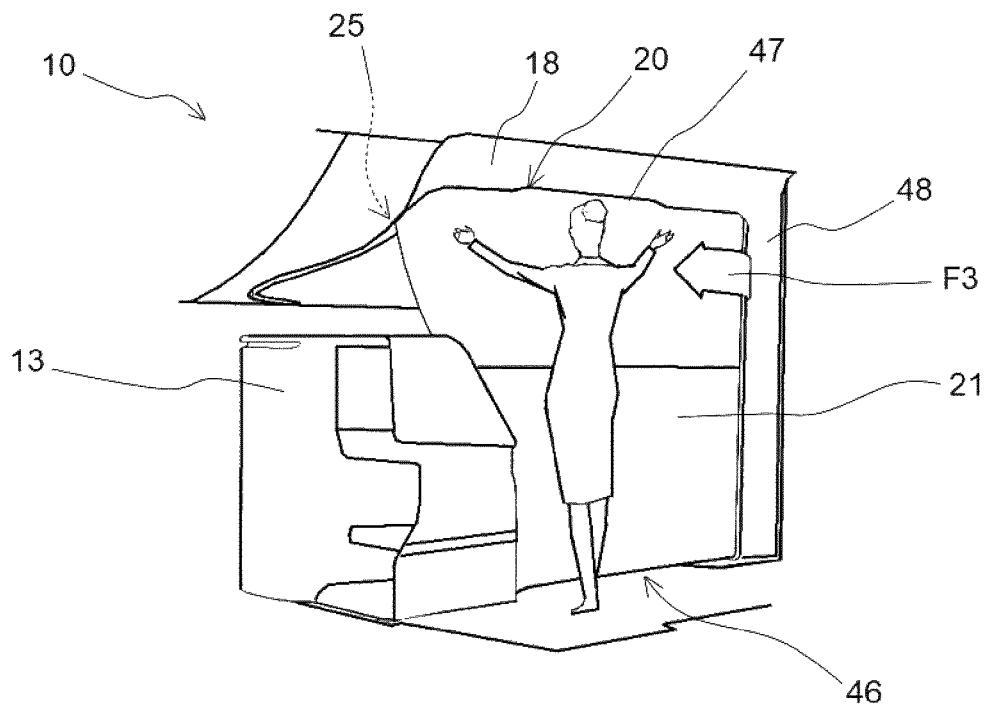

[Fig. 10]
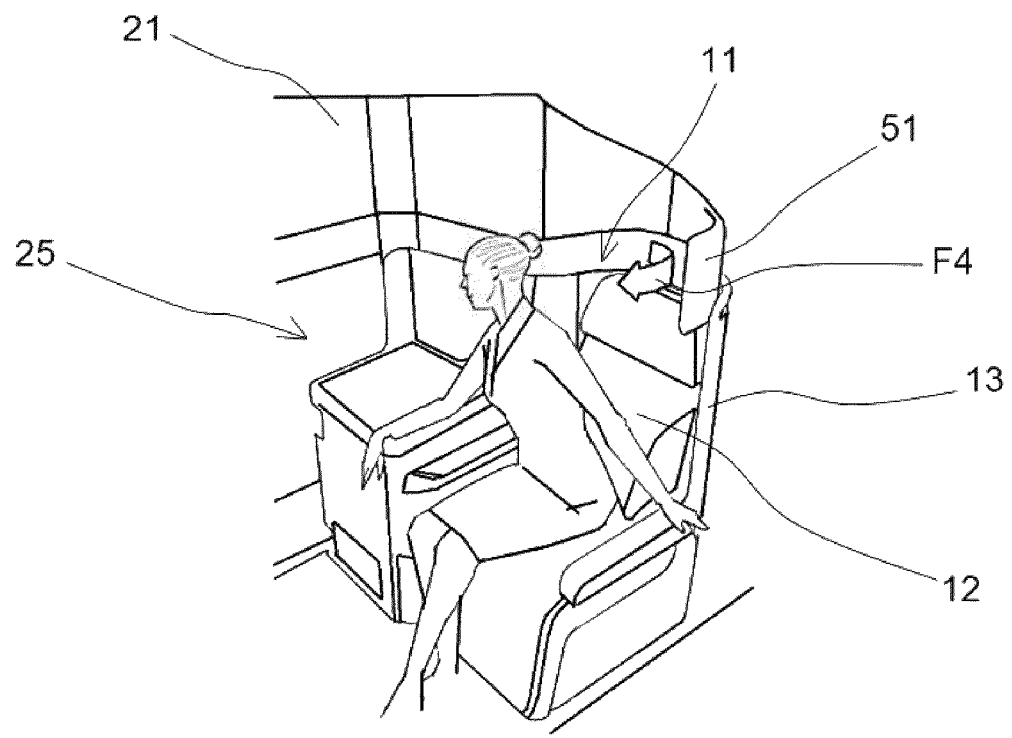

SYSTEM FOR DEPLOYING A SEPARATION CURTAIN TO CREATE A RESTING SPACE INSIDE AN AIRCRAFT CABIN

The present invention relates to a system for deploying a isolating curtain for creating a rest space inside an aircraft cabin, in particular an airplane cabin.

Devices are known for creating a rest space around of an aircraft seat, in particular a "Business Class" seat, in order to allow crew members to rest among the passengers in an aircraft cabin.

The solutions currently used consist of stretching curtains around a Business class seat. These are a protection from other passengers during sleep phases. These curtains also are a protection from light and lack of privacy with other passengers in order to provide crew members with greater comfort and privacy.

These curtains however pose aesthetic problems as well as integration problems within the aircraft cabin. Indeed, curtains require the installation of bulky and unsightly modules, such as exposed rails which degrade the quality perceived by the passengers in the cabin.

Furthermore, the usefulness of these curtains is not clearly communicated to passengers. This can lead passengers to question their function in the cabin. In particular, passengers may wonder if these curtains are used to hide a broken seat or form a medical tent. The curiosity of certain passengers who may be tempted to look behind the curtains is likely to disturb the rest of the crew members. This can result in embarrassing situations for both passengers and crew members.

Thus, known curtain systems do not allow members crew to sleep comfortably while being isolated from other passengers in the cabin. These systems also do not meet the qualitative criteria in terms of finish and aesthetics for a Business class cabin.

The invention aims to effectively remedy at least one of the aforementioned drawbacks by proposing an assembly for an aircraft cabin comprising:
- at least one seat unit comprising a seat and a privacy shell extending at least partly around the seat,
- at least one isolating curtain, and
- a storage compartment delimiting an internal volume,
- a system for deploying the isolating curtain configured to selectively give the isolating curtain:
- a stored state in which said isolating curtain is placed mainly inside the internal volume of the storage compartment, and
- a deployed state in which said isolating curtain is arranged mainly outside the internal volume of the storage compartment so as to delimit at least partly a closed rest space around the seat unit.

The invention thus allows the isolating curtain to be integrated harmoniously into an aircraft cabin without degrading the aesthetic appearance or the perceived quality of a Business class cabin. Indeed, the invention does not require the addition of bulky and visually unsightly modules in the cabin, such as the installation of exposed rails. Additionally, when the solution is not deployed, the isolating curtain can be discreetly stored in the compartment without disturbing passengers. The invention also makes it possible to improve the separation between the rest space for a crew member and the rest of the cabin. Rest conditions for crew members are therefore also improved. The invention is also economical, in that it is simple to produce and requires almost no modification to the cabin.

According to one embodiment of the invention, the storage compartment is located in the upper part of said aircraft cabin, and the system deploying for the isolating curtain is arranged inside the internal volume of the storage compartment so that in the deployed state the isolating curtain extends vertically from the storage compartment so as to delimit at least partly the closed space.

According to one embodiment of the invention, the isolating curtain is able to deploy vertically from the storage compartment up to an upper edge of the privacy shell, so that at least a portion of a wall delimiting the closed space is formed in the upper part by the isolating curtain and in the lower part by the privacy shell.

According to one embodiment of the invention, the isolating curtain has a shape matching that of an upper edge of the privacy shell.

According to one embodiment of the invention, the isolating curtain is weighted in its lower part.

According to one embodiment of the invention, the deploying system comprises a reel around which the isolating curtain is mainly wound in the stored state.

According to one embodiment of the invention, an actuation device is able of triggering the passage of the isolating curtain from one state to another.

According to one embodiment of the invention, the actuation device comprises a trigger to be pulled in order to move the isolating curtain from the stored state to the deployed state.

According to one embodiment of the invention, the actuation device comprises a crank.

According to one embodiment of the invention, the actuation device comprises an electrical system provided with an electric motor allowing the isolating curtain to descend automatically into the deployed state and to rise automatically into the stored state, said electrical system being able to be controlled by a switch near the seat or by a remote control.

According to one embodiment of the invention, the system for deploying the isolating curtain comprises at least one guide rail cooperating with an upper edge of the isolating curtain and a vertical storage compartment delimiting an internal volume inside which the isolating curtain is located in the stored state.

According to one embodiment of the invention, the vertical storage compartment (48) extends vertically along a width of the isolating curtain.

According to one embodiment of the invention, the guide rail is mounted inside a groove.

According to one embodiment of the invention, the guide rail is mounted on a baggage compartment in the upper part of the aircraft cabin.

According to one embodiment of the invention, the isolating curtain includes a mark in the form of a text and/or a symbol indicating that the isolating curtain delimits a rest space for crew members.

The invention also relates to an aircraft cabin comprising the assembly as defined previously.

The present invention will be better understood and other characteristics and advantages will become apparent on reading the detailed following description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a partial perspective view of a cabin aircraft equipped with a system for deploying an isolating curtain according to the present invention integrated into a baggage compartment;

FIG. 2 is a detailed view of a weighted part of a isolating curtain according to the present invention;

FIG. 3 is a perspective view of a reel that can be used with the system for deploying an isolating curtain according to the present invention;

FIG. 4 is a perspective view of a crank and a strap reel that can be used with the system for deploying the isolating curtain according to the present invention;

FIGS. 5a and 5b are side views illustrating the deployment of a curtain making it possible to delimit a closed rest space around a seat unit;

FIG. 6 is a perspective view of an isolating curtain made of a padded material in the deployed state;

FIG. 7 is a perspective view of another embodiment of the invention based on the integration of a guide rail and a vertical storage compartment in the aircraft cabin;

FIG. 8 is a perspective view showing against light the installation of a guide rail for an isolating curtain in the upper part of the aircraft cabin;

FIG. 9 is a perspective view illustrating a deployment of an isolating curtain along a guide rail;

FIG. 10 is a perspective view illustrating a closing of the curtain from a closed space created by the deployment thereof.

It should be noted that in the figures the structural elements and/or functionalities common to the different embodiments may have the same references. Thus, unless otherwise stated, such elements have identical structural, dimensional and material properties.

FIG. 1 shows an airplane cabin 10 comprising a plurality of seat units 11, for example of the Business class type. Conventionally, the aircraft cabin has several rows of seat units 11 behind one another. However, only one seat unit 11 has been shown in the figure in order to facilitate understanding of the invention. A seat unit 11 includes a seat 12 and a privacy shell 13 extending at least partly around the seat 12 in order to isolate the passenger from the external environment.

The seat 12 can offer a passenger different comfort positions, from a "seating" position to a "bed" position, in which the seat 12 defines a substantially horizontal sleeping surface so that the passenger can lie down. Intermediate comfort positions are also offered, such as the "relax" position in which a back of the seat 12 is strongly inclined. Generally, these intermediate positions are obtained by the inclination of the pivoting backrest around a horizontal axis and perpendicular to an axis of extension of the seat 12. The passenger can remain on the seat 12 during transitions between the different positions.

The seat unit 11 may also include a side cabinet 15 having an upper face on which the passenger can place objects. The side cabinet 15 may be provided with a foot housing 16 for receiving the feet of a passenger of a corresponding rear seat, in particular when the rear seat is in the "bed" position. Thus, the opening of the leg housing 16 is directed towards the seat 12 immediately behind the side cabinet 15 of the seat unit 11.

Furthermore, a storage compartment 18, such as a luggage compartment, is located in the upper part of the aircraft cabin 10. The storage compartment 18 delimits an internal volume 22. The storage compartment 18 extends longitudinally in a horizontal direction inside the aircraft cabin 10.

A system 20 for deploying an isolating curtain 21 is integrated into the luggage compartment 18. The deployment system 20 is arranged inside the internal volume 22 of the compartment 18. To allow the passage of the curtain 21 outside the compartment 18, an opening 24 is provided in a lower wall of the compartment 18. If necessary, it will be possible to lock a drawer 19 of the compartment 18 in order to prevent a passenger from having access to the system 20 for deploying the curtain 21.

The system 20 for deploying the curtain 21 is configured to selectively give the curtain 21 a stored state and a deployed state. In the stored state, the curtain 21 is placed mainly inside the internal volume 22 of the compartment 18.

As can be seen in FIG. 5b, in the deployed state, the curtain 21 is disposed mainly outside the internal volume 22 and extends vertically from the compartment 18 so as to delimit at least partly a closed rest space 25 around the seat unit 11. When the curtain 21 is in the deployed state, crew members can rest without being disturbed by passengers in the cabin.

Advantageously, the curtain 21 is able to deploy vertically from the compartment 18 up to an upper edge 28 of the shell 13 of the seat 12 so that at least a portion of a wall 26 delimiting the closed rest space 25 is formed in the upper part by the curtain 21 and in the lower part by the privacy shell 13.

The curtain 21 preferably has a shape matching that of the edge upper 28 of the shell 13 of the seat unit 11. By thus providing a tailor-made configuration adapted to the shape of the shell 13 of the seat unit 11, the invention makes it possible to limit light intrusions as much as possible through the curtain 21.

As illustrated in FIG. 2, the curtain 21 can be weighted in its lower part. For this purpose, one or more weights 30 may be placed inside a lining of the curtain 21. This makes it possible to optimize the deployment of the curtain 21, to minimize textile folds, and to better match the shape of the shell 13 of the seat 12.

In certain areas where there is no shell 13 of seat 12, the curtain 21 will be able to extend down to the floor of the aircraft cabin 10.

According to a particular embodiment shown in FIG. 3, the deployment system 20 comprises a reel 31 around which the curtain 21 is mainly wound in the stored state. In the deployed state, the curtain 21 is mainly unrolled from the reel 31. The reel 31 includes fixing interfaces 32 to internal walls of the compartment 18.

An actuation device 33 is capable of triggering the passage of the isolating curtain 21 from one state to another. According to an exemplary embodiment illustrated in FIG. 1, the actuation device 33 comprises a trigger 34 to be pulled in order to move the isolating curtain 21 from the stored state to the deployed state. The passenger thus simply has to sit on the seat 12 and pull the trigger 34 in order to activate the descent of the curtain 21. This makes it possible to maximize the comfort and the speed of deployment of the isolating curtain 21 while having a solution which is simple and intuitive to use for crew members.

As can be seen in FIG. 3, the actuation device 33 may include an electrical system 35 provided with an electric motor 36 allowing the curtain 21 to descend automatically into the deployed state and to rise automatically into the stored state.

The electrical system 35 can be controlled by a remote control 37 or by a switch 38 near the seat 12. The remote control 37 allows the crew member to operate the isolating curtain 21 remotely via a radio frequency or infrared link 44.

Alternatively, as shown in FIG. 4, a crank 40 associated with a strap reel 41 connected to the curtain 21 can be used to control the manual deployment of the curtain 21.

The isolating curtain 21 is preferably made of a flexible material, in particular a textile material. Preferably, the curtain 21 is made of a blackout material. The textile material can be uniformly pleated in order to minimize the unsightly folds of the curtain 21 due to storage. If necessary, the curtain 21 could be made of a padded material, as it is the case in the embodiment in FIG. 6. Such a configuration makes it possible to better isolate from noise and light and thus improve the comfort of crew members. Alternatively, the curtain 21 could be made of leather or imitation leather.

As illustrated in FIG. 5b or 6, the curtain 21 can include a mark 43 in the form of a text and/or a symbol indicating that the curtain 21 delimits a rest space for crew members. This helps clarify its usefulness to passengers.

The curtain 21 is also customizable to the colors of the airline company.

The curtain 21 could alternatively be made from a plurality of rigid elongated panels articulated together like a rolling shutter.

FIGS. 5a and 5b illustrate the deployment of the isolating curtain 21 by the help of the system 20. When s/he wishes to rest, a crew member 45 can sit down on the seat 12 of the seat unit 11. The crew member 45 can then control the lowering of the curtain 21 via the activation of the mechanical trigger 34 (see arrow F1), or the switch 38 or the remote control 37 in the case where the curtain 21 is electrically assisted by the motor 36. The isolating curtain 21 descends vertically into the deployed position according to arrow F2.

As illustrated in FIG. 5b, the curtain 21 in the deployed state then delimits with the privacy shell 13 a closed space 25 around the seat unit 11. Laterally, the wall 26 of the closed space 25 is formed in the upper part by the curtain 21 and in the lower part by the privacy shell 13. The shape of the curtain 21 adapts to the variable height of the privacy shell 13 in particular in indented areas of the shell 13 on either side of an access passage 46 to the aisle of the aircraft cabin. The curtain 21 extends vertically don to the floor of the cabin at the level of the access passage 46 to the aisle which is then obstructed by the blackout curtain 21.

In the embodiment in FIG. 6, the curtain 21 is adapted to a seat unit 11 having another configuration in which the privacy shell 13 has a slope on only one side of the access passage 46.

In order to leave the rest space, the crew member 45 simply has to rise the curtain 21 to the stored state. The curtain 21 can be manually or automatically risen via the activation of the switch 38 or the remote control 37.

It will also be possible to provide a zipper in the curtain 21 to allow the crew member 45 to leave the closed space 25 without having to return the curtain 21 to the stored state.

When the curtain 21 is in the stored state, the latter is found preferably completely inside the internal volume 22 in the compartment 18. There is then no visible modification within the aircraft cabin 10, so that the invention does not affect the general aesthetic appearance of the aircraft cabin 10. In addition, no external element, such as a rail, is likely to generate safety problems during a crash.

Alternatively, the compartment 18 in the upper part of the cabin airplane 10 is a compartment for receiving objects other than luggage. The compartment 18 could be dedicated to the deployment system 20.

In the embodiment in FIGS. 7, 8, 9 and 10, the system 20 for deploying the isolating curtain 21 comprises at least one guide rail 47 cooperating with an upper edge of the isolating curtain 21 and a vertical storage compartment 48 delimiting an internal volume 50 inside which the isolating curtain 21 is placed in the stored state.

For this purpose, the upper edge of the isolating curtain 21 may be provided with ring type guides, carriages, or sliding hooks cooperating with the guide rail 47.

The guide rail 47 is mounted in the upper part of the aircraft cabin, in particular on the baggage compartment 18. The guide rail 47 follows a shape of the privacy shell 13 around the seat 12 and extends up to the vertical storage compartment 48. At least a portion of the guide rail 47 is located inside the internal volume 50 in the storage compartment 48. Preferably, as can be seen in FIGS. 7 and 8, the guide rail 47 is mounted inside a groove 49 so as to be hidden from a person in the aircraft cabin.

The storage compartment 48 extends longitudinally along a vertical direction inside the aircraft cabin 10. The storage compartment 48 extends vertically along a width of the isolating curtain 21. Advantageously, the vertical storage compartment 48 is arranged at the end of a row of seat units 11 so as to be able to discreetly store the isolating curtain 21 in its internal volume 50 without compromising the overall aesthetic appearance of the aircraft cabin 10.

As illustrated in FIGS. 8 and 9, in order to pass the isolating curtain 21 from a stored state inside the internal volume 50 in the vertical storage compartment 48 to a deployed state, a crew member 45 will be able to pull the isolating curtain 21 laterally according to the deployment arrow F3. In the deployed state, the isolating curtain 21 is located mainly outside the internal volume 50 in the storage compartment 48. The isolating curtain 21 then partially surrounds the seat 12, in particular closing the access passage 46 to the aisle in the aircraft cabin 10 so as to delimit the closed space 25.

The crew member 45 will be able to close the curtain from inside the closed space 25 thus created, as shown in FIG. 10. To this end, a rim 51 of the isolating curtain 21 can be fixed along the arrow F4 on a wall using self-gripping Velcro-type fasteners (Registered trademark) or a magnet system.

Alternatively, the deployment of the isolating curtain 21 could be automatic. For this purpose, the isolating curtain 21 can be mounted on an electrically driven carriage which can be activated, for example, by means of a button near the seat 12 or a remote control.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way example. It encompasses various modifications, alternative forms and other variants that those skilled in the art may consider in the context of the present invention and in particular all combinations of the different modes of operation described above, which can be taken separately or in combination.

The invention claimed is:

1. An assembly for an aircraft cabin comprising:
   at least one seat unit comprising a seat and a privacy shell extending at least partly around the seat,
   at least one isolating curtain, and
   a storage compartment delimiting an internal volume, characterized in that said assembly further comprises a system for deploying the isolating curtain,
   said system for deploying the isolating curtain being configured to selectively give the isolating curtain:

a stored state in which said isolating curtain is arranged mainly inside the internal volume in the storage compartment, and a deployed state in which said isolating curtain is arranged mainly outside the internal volume in the storage compartment so as to delimit at least partly a closed rest space around the seat unit, wherein the storage compartment is located in the upper part of said aircraft cabin, the system for deploying the isolating curtain being arranged inside the internal volume in the storage compartment so that in the deployed state the isolating curtain extends vertically from the storage compartment so as to delimit at least partly the closed space, and wherein the isolating curtain is able to deploy vertically from the storage compartment up to an upper edge of the privacy shell, so that at least one portion of a wall delimiting the closed space is formed in the upper part by the isolating curtain and in the lower part by the privacy shell.

2. The assembly according to claim 1, characterized in that the isolating curtain has a shape matching that of the upper edge of the privacy shell.

3. The assembly according to claim 1, characterized in that the deployment system comprises a reel around which the isolating curtain is mainly wound in the stored state.

4. The assembly according to claim 1, characterized in that the isolating curtain comprises a mark in the form of a text and/or a symbol indicating that the isolating curtain delimits a rest space for crew members.

5. The assembly according to claim 1, characterized in that an actuation device is capable of triggering the passage of the isolating curtain from one state to another.

6. The assembly according to claim 5, characterized in that the actuation device comprises an electrical system provided with an electric motor allowing the isolating curtain to descend automatically to the deployed state and to return automatically to the stored state, said electrical system being able to be controlled by a switch near the seat or by a remote control.

7. The assembly according to claim 1, characterized in that the system for deploying the isolating curtain comprises at least one guide rail cooperating with an upper edge of the isolating curtain and a vertical storage compartment delimiting an internal volume inside which the isolating curtain is located in the stored state.

8. The assembly according to claim 7, characterized in that the guide rail is mounted in the upper part of the aircraft cabin on a baggage compartment.

* * * * *